United States Patent [19]
Rieke et al.

[11] Patent Number: 5,535,558
[45] Date of Patent: Jul. 16, 1996

[54] PLASTIC ROOF VENT AND METHOD OF MAKING

[75] Inventors: Eric A. Rieke, Lapeer; Charles E. Schiedegger, Metamora; Jack G. Wnuk, Lapeer, all of Mich.

[73] Assignee: Mid-America Building Products Corporation, Plymouth, Mich.

[21] Appl. No.: 280,848

[22] Filed: Jul. 26, 1994

[51] Int. Cl.$^6$ .................................................. E04D 13/17
[52] U.S. Cl. ............................ 52/199; 52/302.1; 454/365
[58] Field of Search ............................... 52/57, 199, 749, 52/302.1, 302.3; 454/365

[56] References Cited

U.S. PATENT DOCUMENTS

| | | |
|---|---|---|
| 4,924,761 | 5/1990 | MacLeod . |
| 5,009,149 | 4/1991 | MacLeod . |
| 5,174,076 | 12/1991 | Schiedegger . |

*Primary Examiner*—Creighton Smith
*Attorney, Agent, or Firm*—Barnes, Kisselle, Raisch, Choate, Whittemore & Hulbert

[57] ABSTRACT

The plastic roof vent including a longitudinally extending thinner portion is provided adjacent the vanes and a foraminous strip is bonded as by heat bonding or ultrasonic welding to the roof vent. In accordance with the method and apparatus, the plastic roof vent is bent along the thinner hinge line to provide access for placing of the strip of porous material and for bonding the strip to the plastic roof vent.

14 Claims, 5 Drawing Sheets

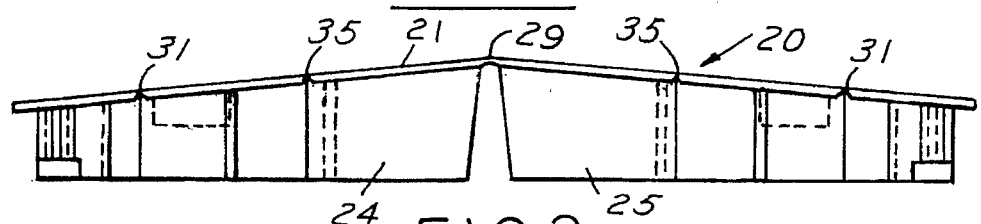
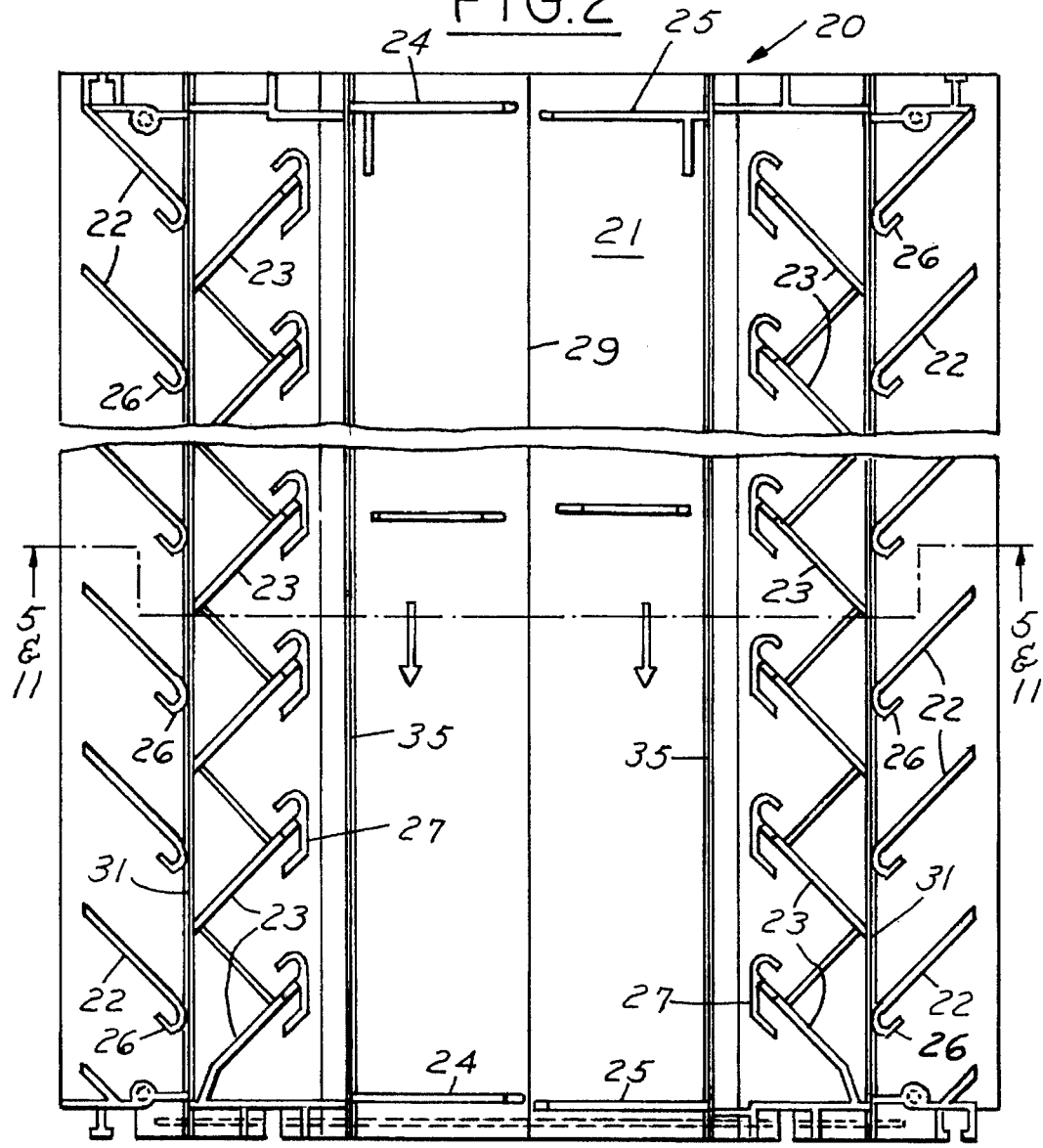
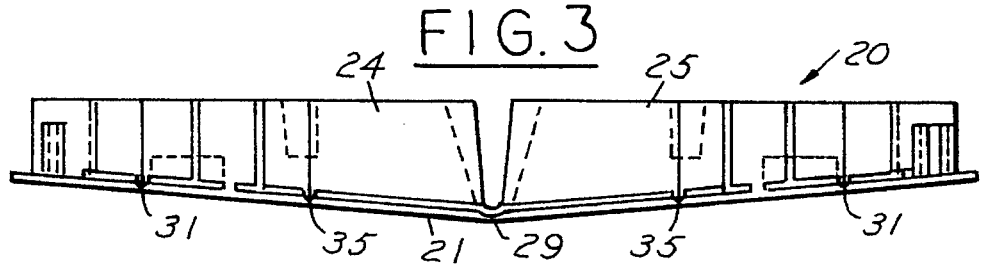

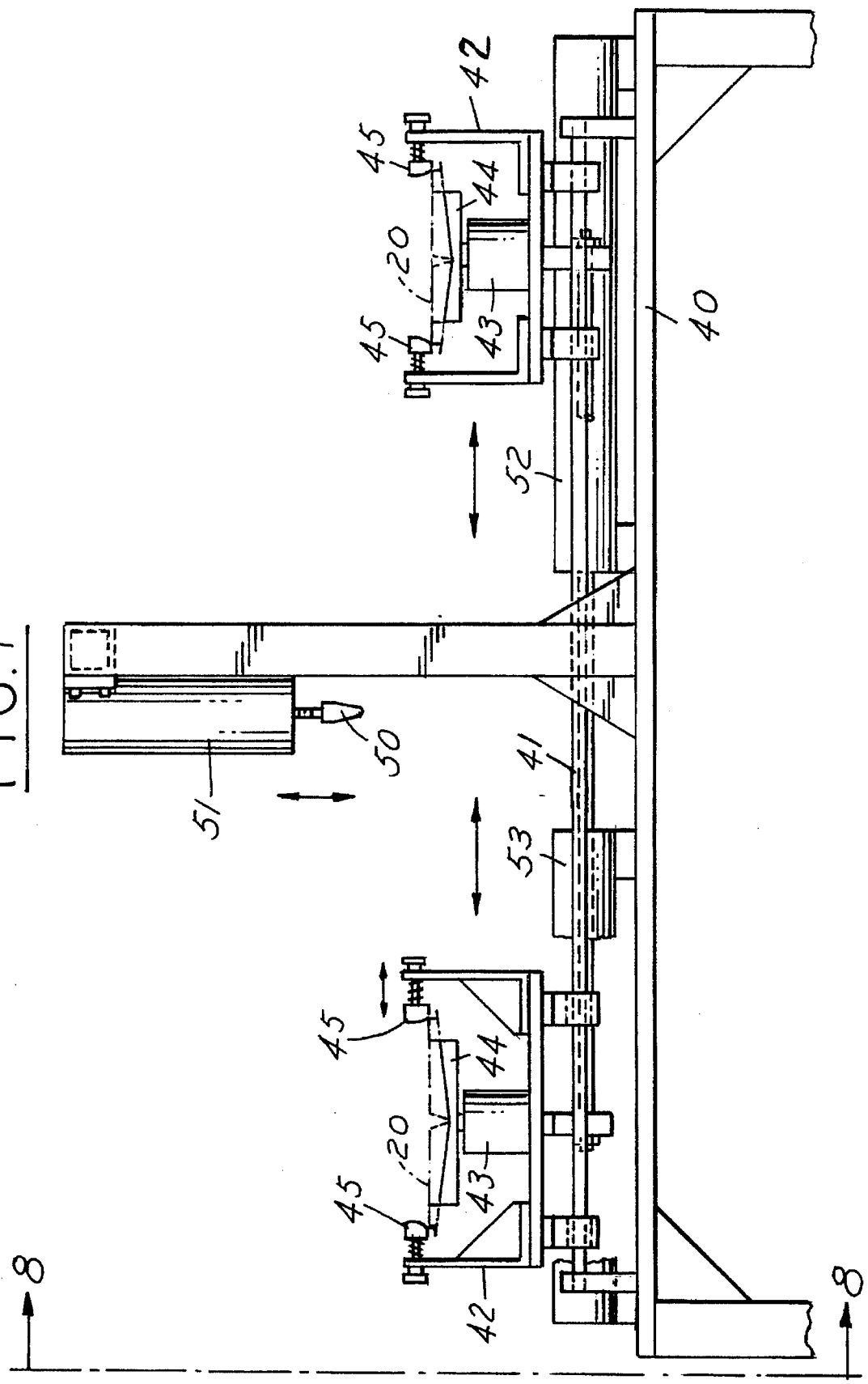

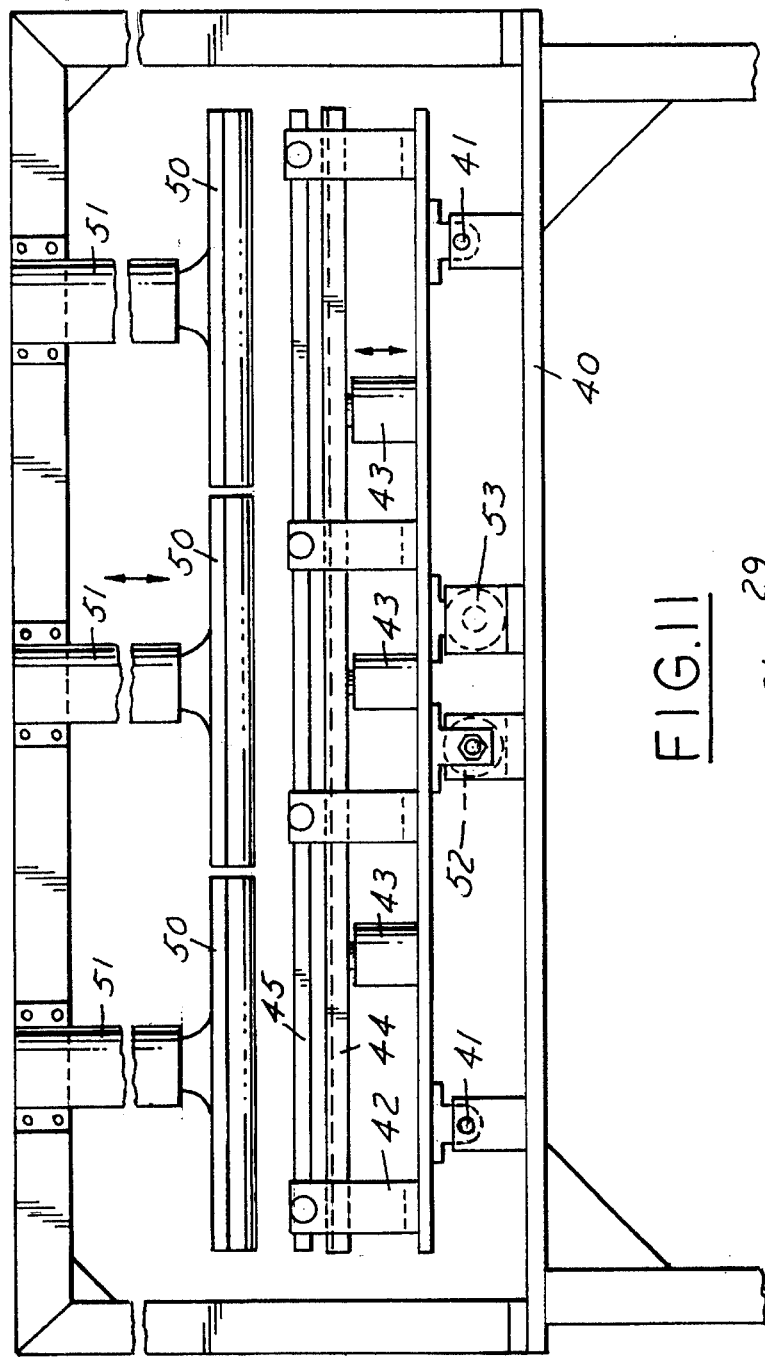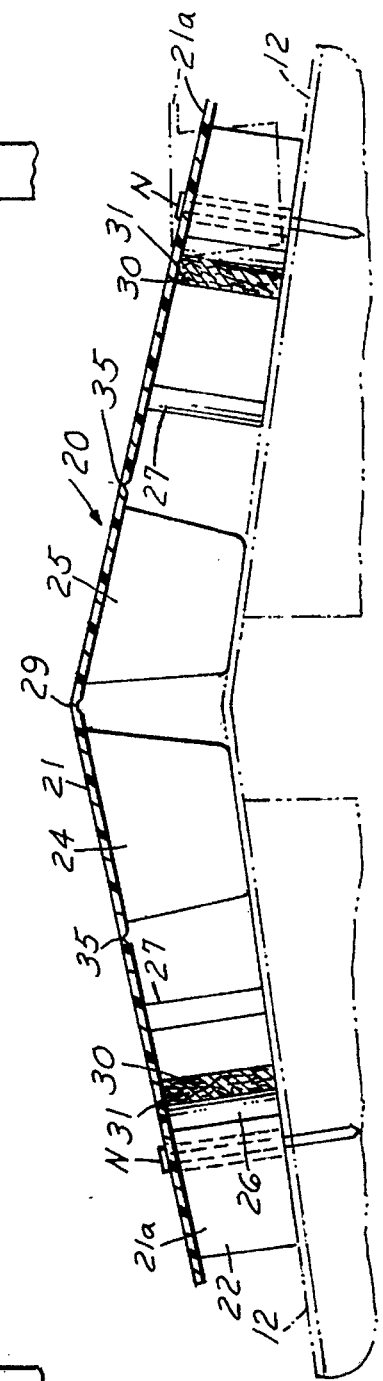

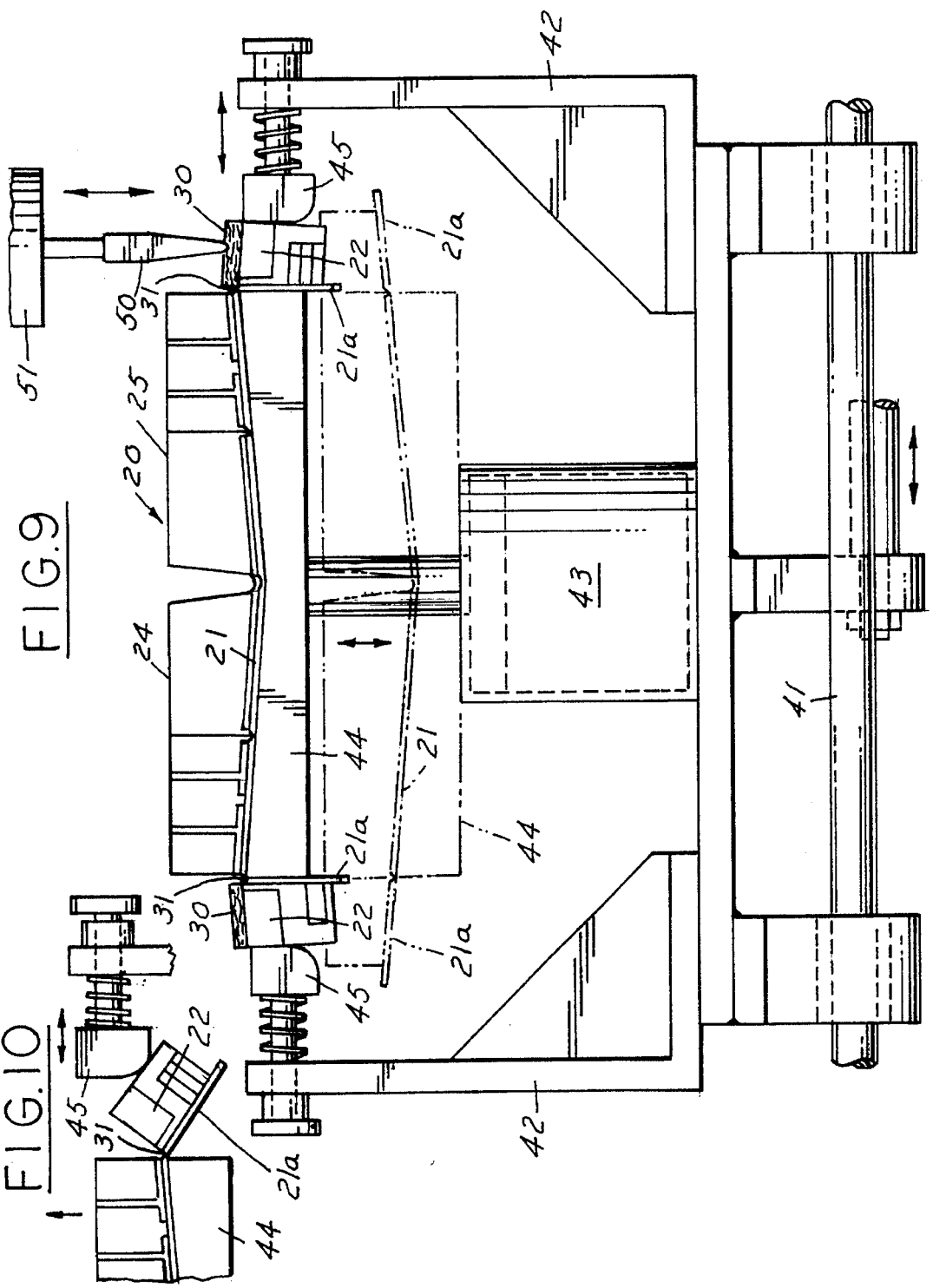

PLASTIC ROOF VENT AND METHOD OF MAKING

BACKGROUND AND SUMMARY OF THE INVENTION

This invention relates to roof vents.

It has heretofore been known that it is desirable to provide roof vents for ventilating a roof.

Prior roof vents have been known. For example, U.S. Pat. No. 4,924,761 discloses a roof vent comprising a onepiece plastic body having a base wall with transversely spaced rows of integral vanes extending from one surface. The vanes of adjacent rows define a sinuous path through which air is vented when the vent is positioned with the vanes engaging the roof and the base wall spaced from the roof. The vanes also prevent water and snow from entering beneath the vent.

The roof vent of U.S. Pat. No. 5,009,149 discloses a similar roof vent constructed to further inhibit water or snow from entering underneath the roof vent. The vanes of the inner row have a longer length than the vanes of the outer row and are provided with an axially extending straight portions having a curved portion to further deflect moisture.

A roof vent for a hip roof is disclosed in assigned U.S. Pat. No. 5,174,076, issued Dec. 29, 1992, having a common assignee with the present application. A separate wall with a longitudinally extending portion is provided with a roof vent where the wall lies between the ends of the vanes of the roof vent and the roof and the longitudinally extending portion extends toward the base wall of the roof vent. This separate wall prevents snow and water from entering laterally underneath the roof vent.

In co-pending application Ser. No. 08/010,609 filed Jan. 28, 1993, having a common assignee with the present invention, there is disclosed a roof vent comprising an integral one-piece plastic body including a base wall with air guiding vanes to ventilate the interior of a building. A plurality of spaced intermediate supports are provided along the central longitudinal axis of the plastics body. The intermediate supports are adapted to facilitate folding at the center of the vent and maintain a straight line bend and to provide support for the central portion of the vent. Thus, the vent is prevented from bowing or collapsing due to the weight from snow buildup or due to the impact of nailing the vent to the roof. Additionally, the supports overlap for use with roofs having different angles.

In each of the above described roof vents a strip of porous material is provided to prevent insects and blowing snow from entering the building while permitting air to exit from under the roof. It has been found that the placement of the strip of porous material is critical.

Among the objectives of the present invention are to provide a plastic roof vent wherein the strip of material is positioned accurately and carefully; wherein the strip is fixed in position; and to provide a method and apparatus for inserting and bonding the liner material to the plastic roof vent.

In accordance with the invention, a longitudinally extending thinner portion is provided adjacent the vanes and is bonded as by heat bonding or ultrasonic welding to the roof vent. In accordance with the method and apparatus, the plastic roof vent is bent along the thinner hinge line to provide access for placing of the strip of porous material and for bonding the strip to the plastic roof vent.

DESCRIPTION OF THE DRAWINGS

FIG. 1 is an end view of a roof vent embodying the invention.

FIG. 2 is a fragmentary bottom plan view of the roof vent before it is bent to conform to the roof.

FIG. 3 is an end view after the roof vent is molded.

FIG. 7 is an elevational view of an apparatus for bonding the porous liner material to the roof vent.

FIG. 8 is a fragmentary view on an enlarged scale taken along the line 8—8 in FIG. 7.

FIG. 9 is a fragmentary elevational view on an enlarged scale of a portion of the apparatus shown in FIG. 7 showing the parts in a different operative position.

FIG. 10 is a fragmentary view of a portion of the apparatus shown in FIG. 9 in a different operative position.

FIG. 11 is a fragmentary sectional view through a roof vent as applied to a roof.

DESCRIPTION OF THE PREFERRED EMBODIMENTS

Figure 4:
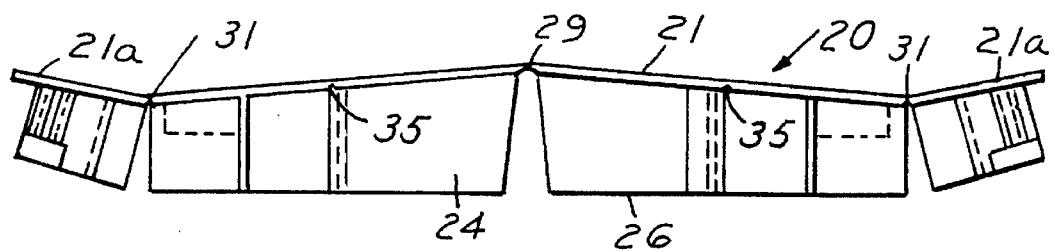
FIG. 4 is an end view showing the bending to facilitate insertion of a porous strip.
Figure 5:
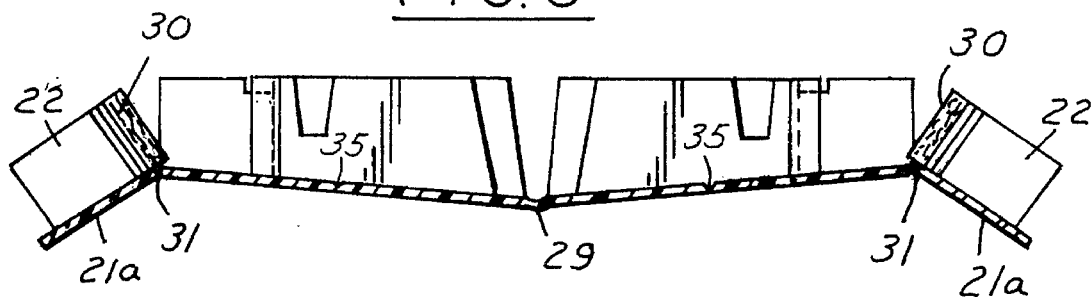
FIG. 5 is a sectional view of the roof vent taken along line 5—5 in FIG. 2 showing the roof vent bent as in FIG. 4.
Figure 6:
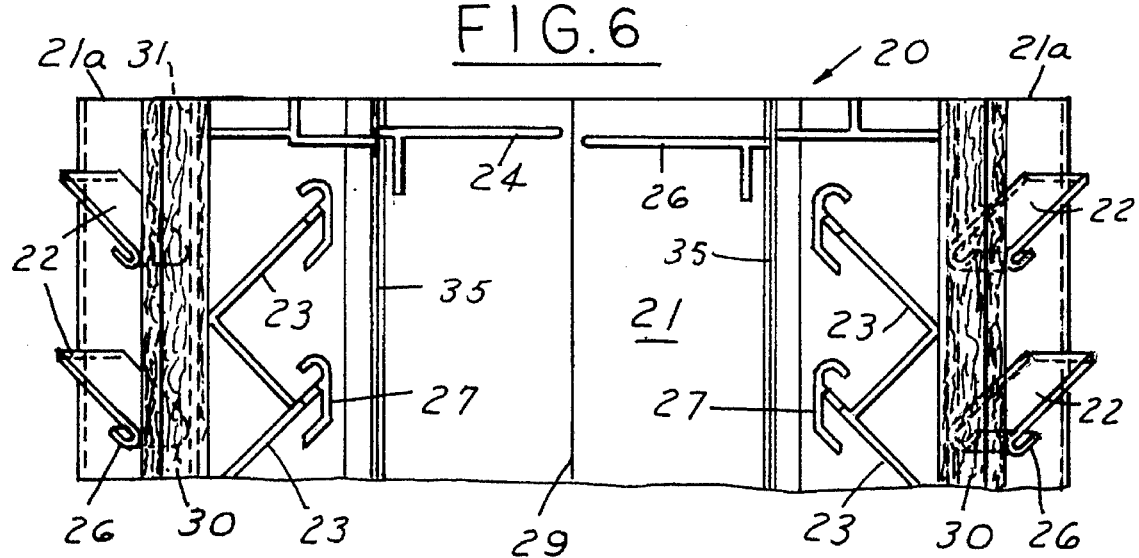
FIG. 6 is a fragmentary plan view of the roof vent shown in FIG. 5.

Referring to FIGS. 1–3, the roof vent 20 embodying the invention comprises an integral one-piece plastic body which is molded preferably by injection molding and includes a base wall 21. The roof vent 20 further comprises means for guiding air from the inside of a building to the exterior thereof, such as, for example, pairs of air guiding vanes 22, 23. The air guiding vanes 22, 23 comprise a plurality of rows of vanes extending generally perpendicular from the base wall 21. In addition, the roof vent includes end walls 24, 25 that are molded integrally with the base wall 21 and extend outwardly in relatively longitudinally spaced relation. The end walls 24, 25 have free edges that engage the roof 12 (FIG. 11). Each set of the vanes 22, 23 are provided in two rows along the longitudinal edges of the base wall 21, the vanes being identical except that the row of vanes 22 in the outermost row are in longitudinally spaced parallel relation and the vanes 23 in the innermost row are in longitudinally space relation such that a plane containing vanes 22 intersects a plane containing vanes 23. In addition, each of the vanes 22 is provided with a curved end 26 as are the vanes 23 provided with a curve end 27. The curved ends 26, 27 function to entrap water and snow that may be blown inwardly by the wind. Thus, air is vented through a sinuous path outwardly when the vent is positioned with the vanes engaging the roof in the base wall spaced from the roof.

The base wall 21 is formed with a portion 29 that extends longitudinally and has a thinner cross section so that the user can bend the wall to the desired angle for conforming the roof vent to the angle of the roof members 12. After such conformation, the nails can be driven through round openings to mount the vent in position on the roof.

The above construction is substantially similar to that shown in U.S. Pat. Nos. 4,924,761 and 5,009,149, incorporated herein by reference.

Further, a layer 30 of foraminous material such as open cell foam plastic is interposed between the adjacent ends of the vanes 22, 23 and functions to prevent insects and blowing snow from entering the building while permitting air to exit from under the roof.

Referring to FIGS. 1–3, in accordance with the invention the plastic roof vent is molded with a thin longitudinally extending portion 31 defining a live hinge. This facilitates insertion of a porous strip 30 by permitting the portion of the roof vent 21a to be bent about the hinge 31 providing axis for inserting the strip 30 and for bonding the strip to the plastic roof vent preferably to the vanes 22 as by heat bonding. Preferably a second hinge liner 35 is provided for including a second strip or positioning the strip adjacent the inner row of vanes.

Referring to FIGS. 7–10, an apparatus for inserting and bonding the liner material is shown and comprises a base 40 having a slideway 41 thereon for supporting spaced carriages 42 each of which is adapted to support a roof vent. Each carriage 42 includes a cylinder 43 on which a holder 44 is mounted for movement vertically. Roof vent 20 is placed on the holder 44 and the cylinder 43 is actuated to lift the roof vent. In the upward movement, the side edges of the roof vent, which inverted position, engage spring loaded cam members 45 to bend the portions 21a (FIG. 10) to a position where the wings 22 are generally horizontal. An operator can then lay a strip 30 in position. An ultrasonic bonding head 50 is then brought into position to bond each strip in position. In as much as the roof vent has substantial length, on the order of 48 inches, plurality of ultrasonic heads 50 are provided and are movable downwardly into and out of operative position by cylinders 51. Cylinders 52, 53 are provided for reciprocating carriages 42.

By providing an apparatus with a pair of carriages, one carriage can be loaded while the other is in position for bending the roof vent and bonding the liner in position. In addition, each carriage can be used to support a different size roof vent.

Referring to FIG. 11, it can be seen that when the roof vent 20 is placed on a roof, the nails N will cause the side portions 21a to conform to the roof, such nails N having been shown and described in the aforementioned patents, incorporated herein by reference.

What is claimed is;

1. A roof vent comprising a one-piece plastic body including a longitudinally extending base wall having end vanes extending transversely from underneath the plastic body to the exterior, said plastic body having a first thin portion extending along the central longitudinal axis of the roof vent, said plastic body having a second thin portion extending longitudinally adjacent the vanes defining a hinge portion, said vane means comprising two longitudinally extending rows of vanes, said second thin portion forming said hinge being provided between said two rows of vanes, a strip of porous material extending along between said vane means adjacent said second thin portion and bonded to the roof vent.

2. The roof vent set forth in claim 1 wherein said strip is bonded to one of said row of vanes by ultrasonic bonding.

3. The roof vent set forth in any one of claims 1 and 2 including a third thin portion extending longitudinally.

4. The method of making a roof vent comprising providing a one-piece plastic injection molded body including a longitudinally extending base wall having integral vane means comprising two rows of vanes extending transversely from underneath the plastic body to the exterior, providing said plastic body with a first thin portion extending along the central longitudinal axis of the roof vent, providing said plastic body with a second thin portion defining a hinge portion between said two rows of vanes, providing a strip of porous material extending along said vane means adjacent said second thin portion, and bonding said strip to the roof vent.

5. The method set forth in claim 4 wherein the step of bonding said strip to one of said sets of vanes comprises ultrasonic bonding.

6. The method set forth in any one of claims 4 and 5 wherein said step of bonding said strip comprises bending the side edges of the plastic body relative to the remainder of the plastic body along said hinge portion, inserting said strip of porous material adjacent said two rows of vanes while the plastic roof vent is bent, and bonding the strip to one row of vanes.

7. The method set forth in claim 6 including providing a pair of carriages movable toward and away from a bonding station, loading a plastic roof vent onto one of the carriages, moving said one carriage to said bonding station for bending the side edges, inserting a strip, bonding the strip to said row of vanes, and loading another plastic roof vent in the other carriage, removing said one carriage from its position at the bonding station and moving the other carriage to the bonding station for bending the side edges, inserting a strip and bonding the strip.

8. The method set forth in claim 7 including providing a bending apparatus on each said carriage for bending the side edges during loading a plastic vent on said carriage.

9. An apparatus for forming a plastic roof vent which comprises a one-piece plastic body defining a hinge having a longitudinally extending base wall, a first thin portion in said plastic body extending along the central longitudinal axis of said roof vent, integral vane means comprising two rows of vanes extending transversely from underneath said plastic body to the exterior and along a side edge defined by said hinge for guiding air under plastic body, a second thin portion extending longitudinally of said vanes and defining a second hinge extending longitudinally adjacent said vane means, which comprises means for bending the side edge of the plastic body relative to the remainder of the plastic body along the second hinge such that a strip of porous material can be inserted adjacent said vane means while the plastic roof vent is bent, and means for heat bonding ultrasonically welding the strip to the vane means.

10. The apparatus set forth in claim 9 wherein said means for bonding said step comprises ultrasonic welding means.

11. The apparatus set forth in claim 10 including a carriage on which said plastic roof vent is mounted and means associated with said carriage for holding the edges of said roof vent and means for applying a transverse force intermediate said edges to bend said side edges.

12. The apparatus set forth in claim 11 including a substantially identical carriage and means for supporting and selectively moving said carriages into position adjacent said ultrasonic welding means.

13. The apparatus set forth in claim 12 including means for supporting and moving said ultrasonic welding means into welding position.

14. The apparatus set forth in claim 13 wherein said ultrasonic welding means comprises a head and means for moving said head toward the roof vent when in position for welding.

* * * * *